United States Patent
Wu et al.

(10) Patent No.: US 12,050,007 B2
(45) Date of Patent: Jul. 30, 2024

(54) LOW-CARBON ENERGY UTILIZATION SYSTEM FOR STEAM AND POWER COGENERATION OF OIL FIELD

(71) Applicant: Tsinghua University, Beijing (CN)

(72) Inventors: Yuxin Wu, Beijing (CN); Qi Liu, Beijing (CN); Junfu Lv, Beijing (CN); Man Zhang, Beijing (CN); Yang Zhang, Beijing (CN); Zhong Huang, Beijing (CN); Tuo Zhou, Beijing (CN); Qing Liu, Beijing (CN)

(73) Assignee: Tsinghua University (CN)

( * ) Notice: Subject to any disclaimer, the term of this patent is extended or adjusted under 35 U.S.C. 154(b) by 450 days.

(21) Appl. No.: 17/501,065

(22) Filed: Oct. 14, 2021

(65) Prior Publication Data
US 2022/0325885 A1 Oct. 13, 2022

(30) Foreign Application Priority Data
Apr. 8, 2021 (CN) .......................... 202110378204.9

(51) Int. Cl.
*F22B 33/18* (2006.01)
*E21B 43/24* (2006.01)
(Continued)

(52) U.S. Cl.
CPC .............. *F22B 33/18* (2013.01); *E21B 43/24* (2013.01); *E21B 43/2406* (2013.01); *F22B 1/28* (2013.01);
(Continued)

(58) Field of Classification Search
CPC .................................. F22B 33/18; F22G 1/165
See application file for complete search history.

(56) References Cited

U.S. PATENT DOCUMENTS

2014/0083694 A1* 3/2014 Scott ...................... F22B 29/06
122/451 S
2014/0110109 A1* 4/2014 Latimer .................. F22B 29/06
166/57

FOREIGN PATENT DOCUMENTS

CN 106297925 A * 1/2017
CN 108105033 A * 6/2018 ......... E21B 43/2401

OTHER PUBLICATIONS

Drinking_Water Drinking_Water_Treatment_Cation_Exchange_Units (Year: 2019).*
(Continued)

*Primary Examiner* — Steven S Anderson, II
*Assistant Examiner* — Kurt J Wolford
(74) *Attorney, Agent, or Firm* — Sand, Sebolt & Wernow Co., LPA

(57) ABSTRACT

A low-carbon energy utilization system for steam and power cogeneration of oil field is provided, which includes a first water pump device, a second water pump device, electric heating devices, a liquid mixer, a fossil-fuel steam injection boiler, a steam mixer, a super-heater, and a new energy generation station. The electric heating devices are connected to the first water pump device. The liquid mixer is connected to the second water pump device and the electric heating devices. The fossil-fuel steam injection boiler is connected to the liquid mixer. The steam mixer is connected to the electric heating devices and the fossil-fuel steam injection boiler. The super-heater is connected to the steam mixer. The new energy generation station is used for supplying power to the electric heating devices.

9 Claims, 1 Drawing Sheet

(51) Int. Cl.
    *F22B 1/28*         (2006.01)
    *F22B 35/00*      (2006.01)
    *F22G 1/16*        (2006.01)
    *H02J 3/38*        (2006.01)
    *F22B 33/00*      (2006.01)
    *F22D 1/00*        (2006.01)

(52) U.S. Cl.
    CPC ............ *F22B 35/008* (2013.01); *F22G 1/165* (2013.01); *H02J 3/381* (2013.01); *F22B 33/00* (2013.01); *F22D 1/003* (2013.01); *H02J 2300/10* (2020.01); *H02J 2300/20* (2020.01)

(56) References Cited

OTHER PUBLICATIONS

Energy_Saver_grid_connected_renewable_energy_systems (Year: 2015).*
Graver_Steam_generator_blowdown (Year: 2016).*
IEEE_Wind_Farm_Electrical_Systems (Year: 2013).*
Wayback_Machine_IEEE_Wind_Farm_Electrical_Systems (Year: 2024).*
CN-106297925-A English translation (Year: 2017).*
CN-108105033-A English translation (Year: 2018).*

* cited by examiner

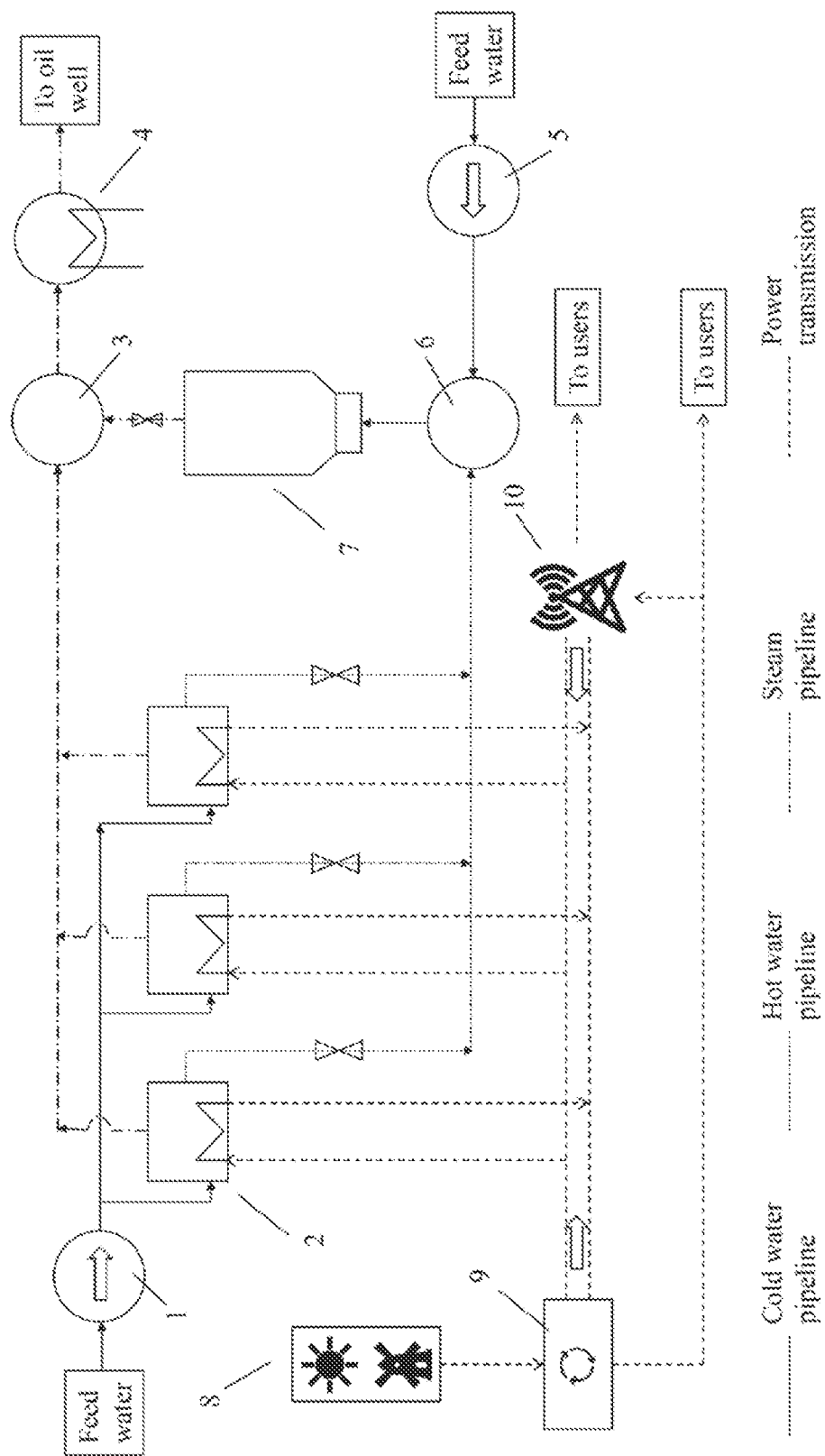

LOW-CARBON ENERGY UTILIZATION SYSTEM FOR STEAM AND POWER COGENERATION OF OIL FIELD

CROSS REFERENCE TO RELATED APPLICATION

This patent application claims the benefit and priority of Chinese Patent Application No. 202110378204.9 filed on Apr. 8, 2021, the disclosure of which is incorporated by reference herein in its entirety as part of the present application.

TECHNICAL FIELD

The present disclosure relates to the field of low-carbon energy comprehensive utilization technologies, and in particular to a low-carbon energy utilization system for steam and power cogeneration of oil field.

BACKGROUND ART

With the proposal of the strategy of "hit peak carbon dioxide emissions before 2030 and achieve carbon neutrality by 2060" in China, energy conservation and carbon reduction have become important issues in the field of energy production and consumption. Oil field is a main producer of energy and steam for the industry. Especially in the heavy oil recovery, the heavy oil recovery is performed by using steam produced by a large amount of fossil fuels. For the recovery of every 1 ton of heavy oil, 8 tons of steam is required, which consumes about 0.8 ton of raw coal and about 500 cubic meters of natural gas. Accordingly, 1-2 tons of carbon dioxide is emitted correspondingly. Thus, the great pressure of reducing carbon emission is brought to the heavy oil production of the oil field, and the problem must be solved.

With continuous improvement of new energy technologies such as wind energy, light energy and the like, the construction cost for power that is produced by the wind energy and the light energy is decreased remarkably, and thus this technology is to be utilized in a larger scale in future. A large amount of idle and unusable land in a certain area of the oil field is suitable for building devices that generates power by using wind energy and sunlight energy. So, carbon emission can be effectively reduced through the production of the new energy. However, due to the characteristics that the new energy such as wind energy and light energy is high in periodicity and large in fluctuation, the power generated by the new energy, such as wind energy and light energy, is hard to be consumed by the power grid. Thus, there exits the problem that the national average power discarded rate of the new energy per year exceeds 15%, which is hard to change within a short time. It is of great significance for green low-carbon production of the oil field that, how to combine the new energy with an existing energy utilization system for the fossil in oil field to achieve consumption of discarded power and achieve a target of low-carbon emission. Taking the Xinjiang Oil Field as an example, many wind turbines and photovoltaic equipment are in an idle state for a long time, so the phenomenon of discarding wind and light is serious. In 2020, the electric quantity of discarded wind in Xinjiang is 10.7 billion kilowatt-hour, the electric quantity of discard light is 2.14 billion kilowatt-hour. Thus, the wind discarded rate and the light discarded rate are 23% and 16% respectively, which is the highest nationwide. If the low-carbon clean energy in Xinjiang region can be efficiently applied to the heavy oil recovery, the discarded wind and the discarded light in Xinjiang region can produce more than 17 million tons of steam, which is of great significance for guaranteeing heavy oil recovery and achieving new energy optimal arrangement throughout the Xinjiang region. Accordingly, this is an important direction for low-carbon clean energy development in the future.

At present, a solar photothermal conversion steam-injection system is a mainstream direction of low-carbon clean energy utilization in a thermal recovery system of heavy oil. High-temperature and high-pressure steam that is generated by solar photothermal conversion technology is used in thermal recovery of heavy oil, thereby achieving conversion and utilization of the energy. The above-mentioned solar photothermal conversion is a process that sunlight is converged to a solar thermal collector by means of a concentrating reflector, an energy storage medium (such as heat conduction oil and fused salt) is circularly heated by the solar thermal collector, and the high-temperature and high-pressure steam is generated by heat exchange between the energy storage medium and water. The thermal recovery system of heavy oil based on solar photo-thermal conversion is divided into five parts according to functions, which mainly includes: a solar concentrating and thermal collecting system, a thermal storage and energy storage system, a steam generation system, a steam injection and oil recovery system, and a utility system. According to different concentrating ways, the thermal collecting system is divided into four forms: trough type, tower type, parabolic dish type, and Fresnel type. The trough-type solar thermal collecting system and the tower-type solar thermal collecting system are mainstream technologies in photothermal conversion.

An existing solar photothermal conversion steam-injection technology mainly has the following disadvantages and defects. 1) The thermal efficiency of the solar photothermal conversion is unbalanced, because solar energy has the characteristics of high periodicity and large uncertainty. So, that the produced steam by the solar energy is used only may cause the problem of large steam source fluctuation, which fails to satisfy the needs for heavy oil recovery. 2) Investment and maintenance costs are high. The solar photothermal investment cost exceeds 10,000 yuan/kilowatt, and the maintenance cost of thermal medium pipelines is also high. So, the cost for producing steam is very high, which cannot be afforded by oilfield users. 3) The area of occupation of land for the photothermal power generation is large. A photothermal power station needs to occupy a large amount of land and layout complex pipelines. However, a large amount of oil recovery pipelines has been laid actually in the oil field, so it is impossible to layout a photovoltaic field and thermal pipelines in manner of the low cost. 4) An industrial project in actual operation is absent. Based on two main reasons of the unbalance of thermal efficiency and the poor economic efficiency, the thermal recovery technology of heavy oil based on the solar photothermal conversion has no industrial project in actual operation in China, and this technology is still in a research and design stage.

SUMMARY

The present disclosure aims to at least solve one of the technical problems in the prior art. For this, one purpose of the present disclosure is to provide a low-carbon energy utilization system for steam and power cogeneration of oil field, the steam and power cogeneration of oil field can be realized by cooperatively utilizing low-carbon clean energy such as light energy and wind energy in the oil field, thereby achieving the targets of simultaneously solving the problem of discarded wind and discarded power, as well as realizing the thermal recovery of heavy oil in manner of low carbon in the oil field.

A low-carbon energy utilization system for steam and power cogeneration of oil field according to an embodiment of the present disclosure includes: a first water pump device; a second water pump device; electric heating devices connected to the first water pump device, each of the electric heating devices is used for receiving and heating first water output by the first water pump device, and outputting the first water after being heated and first steam; a liquid mixer connected to the second water pump device and the electric heating devices, wherein second water that is output by the second water pump device and the first water after being heated, which is output by each of the electric heating devices, are entered the liquid mixer; and the second water and the first water after being heated are output by the liquid mixer; a fossil-fuel steam injection boiler connected to the liquid mixer, the fossil-fuel steam injection boiler is used for receiving the second water and the first water after being heated, which are output by the liquid mixer; and the fossil-fuel steam injection boiler is further used for generating and outputting second steam; a steam mixer connected to the electric heating devices and the fossil-fuel steam injection boiler, wherein the first steam that is output by each of the electric heating devices and the second steam that is output by the fossil-fuel steam injection boiler are both entered the steam mixer and are output by the steam mixer; a super-heater connected to the steam mixer, the super-heater is used for receiving third steam output by the steam mixer, the super-heater is used for heating the third steam to be required high-temperature and high-pressure steam, and conveying the required high-temperature and high-pressure steam to an oil well; and a new energy generation station, the new energy generation station is used for supplying power to the electric heating devices.

The low-carbon energy utilization system for steam and power cogeneration of oil field according to the embodiment of the present disclosure has the following advantages. First, the steam is flexibly supplied by adopting the electric heating devices. When the power supply satisfied, the electric heating devices can be used for producing the high-temperature and high-pressure steam, and the steam may enter the steam mixer. When the power supply is insufficient (e.g., the situations that the power generation of the new energy generation station is insufficient, and the user's demand increases, and the like), the electric heating devices can be used for generating hot water, and the hot water further enters the fossil-fuel steam injection boiler through the liquid mixer, and then is heated to be the steam. In this way, power that is generated by low-carbon new energy and cannot be accessed into the oil-field power grid, such as light power and wind power, can be utilized; the power waste can be greatly reduced, and the use of fossil fuels can be reduced maximally. Second, the power generated by new energy and the fossil fuels are used together as an energy source in steam production, and the strong capacity of peak regulation of the fossil-fuel steam injection boiler can make up for the defects that the power of the new energy generation station has high periodicity and large fluctuation. So, the comprehensive energy utilization of the system is achieved, and carbon dioxide emission may be reduced. Third, the characteristic of high thermal inertia of both the steam pipeline and the hot water pipeline is completely utilized. Unstable steam that is generated by the new energy is converted into a stable steam source in thermal recovery of heavy oil through the arrangement of the steam mixer and the liquid mixer, and thus the heavy oil production is guaranteed.

In a word, the low-carbon energy utilization system for steam and power cogeneration of oil field according to the embodiment of the present disclosure can solve the problem of discarded power of new energy in the oil field. Further, power that is generated by low-carbon new energy and cannot be accessed into the oil-field power grid, such as light power and wind power, can be used by the electric heating devices. Meanwhile, the advantage of flexible peak regulation of the fossil-fuel steam injection boiler is fully exerted, so that the part that is insufficiently injected with the steam is supplemented through the fossil-fuel boiler. In this way, the steam injection requirement of the oil field is not only met, but also the use of the fossil fuels can be reduced. On the premise of meeting the requirement of steam injection of the oil field, energy conservation, consumption reduction, and emission reduction are carried out maximally, so as to achieve the steam and power cogeneration.

In one embodiment of the present disclosure, the electric heating devices are connected to the first water pump device through a first pipeline, the liquid mixer is connected to the second water pump device through a second pipeline, the liquid mixer is connected to the electric heating devices through a third pipeline, the fossil-fuel steam injection boiler is connected to the liquid mixer through a fourth pipeline, the steam mixer is connected to the electric heating devices through a fifth pipeline, the steam mixer is connected to the fossil-fuel steam injection boiler through a sixth pipeline, the super-heater is connected to the steam mixer through a seventh pipeline, and the super heater is connected to the oil well through an eighth pipeline.

In one embodiment of the present disclosure, the first water output by the first water pump device is clear water which does not contain base cations with positive solubility and base cations with negative solubility; or the first water is softening salt water which does not contain the base cations with negative solubility and contains the base cations with positive solubility.

In one embodiment of the present disclosure, the electric heating devices are arranged in parallel or/and in series.

In one embodiment of the present disclosure, the electric heating devices are connected to a blowdown pipe.

In one embodiment of the present disclosure, the electric heating devices are high-temperature and high-pressure electric heating boilers.

In one embodiment of the present disclosure, pressure of both the first water after being heated and the first steam generated by each of the electric heating devices is higher than operating pressure of the fossil-fuel steam injection boiler, so as to enable the first water after being heated, which is generated by each of the electric heating devices, to unidirectionally flow into the liquid mixer, and to enable the first steam generated by the each of electric heating devices to unidirectionally flow into the steam mixer.

In one embodiment of the present disclosure, a steam-liquid separation device is arranged in the steam mixer.

In one embodiment of the present disclosure, the second water output by the second water pump device is clear water which does not contain base cations with positive solubility and base cations with negative solubility; or the second water is softening salt water which does not contain the base cations with negative solubility and contains the base cations with positive solubility.

In one embodiment of the present disclosure, the low-carbon energy utilization system further comprises a transformer station and a power grid, wherein the transformer station receives the power from the new energy generation station; a first part of the power received by the transformer station is directly supplied to the electric heating devices; a second part of the power is transmitted to the power grid; and a third part of the power is supplied to users; and one part of the second part of the power that is transmitted to the power grid is directly used by the electric heating devices, and another part of the second part of the power is supplied to other users.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and/or additional aspects and advantages of the present disclosure will become apparent and more readily appreciated from the following descriptions made with reference to the accompanying drawings, in which:

FIG. 1 is a diagram of a low-carbon energy utilization system for steam and power cogeneration of oil field in accordance with an embodiment of the present disclosure.

Reference signs in the drawings:
1—first water pump device; 2—electric heating device; 3—steam mixer; 4—super-heater; 5—second water pump device; 6—liquid mixer; 7—fossil-fuel steam injection boiler; 8—new energy generation station; 9—transformer station; 10—power grid

DETAILED DESCRIPTION OF THE EMBODIMENTS

The embodiments of the present disclosure will be described in detail below, and examples of the embodiments are illustrated in the accompanying drawings, where the same or similar reference numerals throughout denote the same or similar elements or the elements having same or similar functions. The embodiments described herein with reference to accompanying drawings are illustrative, only used to explain the present disclosure, and shall not be construed as limiting to the present disclosure.

A low-carbon energy utilization system for steam and power cogeneration of oil field in accordance with an embodiment of the present disclosure will be described below with reference to FIG. 1.

As shown in FIG. 1, the low-carbon energy utilization system for steam and power cogeneration of oil field in accordance with the embodiment of the present disclosure includes a first water pump device, 1, a second water pump device 5, electric heating devices 2, a liquid mixer 6, a fossil-fuel steam injection boiler 7, a steam mixer 3, a super-heater 4, and a new energy generation station 8. The electric heating devices 2 are connected to the first water pump device 1. The electric heating devices are used for receiving and heating water output by the first water pump device 1, and outputting hot water and steam. The liquid mixer 6 is connected to the second water pump device 5 and the electric heating devices 2. The water output by the second water pump device 5 and the hot water output by the electric heating devices 2 are entered the liquid mixer 6, and are output by the liquid mixer 6. The fossil-fuel steam injection boiler 7 is connected to the liquid mixer 6. The fossil-fuel steam injection boiler 7 is used for receiving the water output by the liquid mixer 6, and producing and outputting steam. The steam mixer 3 is connected to the electric heating devices 2 and the fossil-fuel steam injection boiler 7. The steam output by the electric heating devices 2 and the steam output by the fossil-fuel steam injection boiler 7 enter the steam mixer 3, and are output by the steam mixer 3. The super-heater 4 is connected to the steam mixer 3. The super-heater 4 is used for receiving the steam output by the steam mixer 3 and heating the steam output by the steam mixer 3 to required high-temperature and high-pressure steam, and conveying the required high-temperature and high-pressure steam to an oil well. The new energy generation station 8 is used for supplying the power to the electric heating devices 2.

It is understood that the first water pump device 1 is mainly used for conveying water serving as a heating working medium to the electric heating devices 2. The electric heating devices 2 may heat the input water, and thus the water is heated to produce hot water or steam. Due to the fact that the electric heating devices 2 mainly utilize the power supplied by the new energy generation station 8, this power can be such power that is generated by low-carbon new energy and cannot be accessed into a power grid, such as discarded light power, discarded wind power, and other discarded power in the oil field. That is, the discarded power in the oil field can be fully utilized. Because the power of the new energy generation station is affected by the wind or light, the power may be sufficient sometimes and insufficient sometimes. So, the power fluctuation is large. When the power supply meets the needs, the electric heating devices 2 can be used for producing high-temperature and high-pressure steam, and the steam may enter the steam mixer 3. When the power supply is insufficient, e.g., the situations that the power production of the new energy generation station 8 is insufficient or the power demand of the user increases, and the like, the electric heating devices 2 can be used for producing hot water, the hot water enters the liquid mixer 6 for temporary storage, and then enters the fossil-fuel steam injection boiler 7 to be heated to steam. The second water pump device 5 is mainly used for conveying water to the liquid mixer 6, and then the water is conveyed to the fossil-fuel steam injection boiler 7 by the liquid mixer 6 to be heated to the steam. It should be noted that the liquid mixer 6 is mainly used for receiving the hot water output by the electric heating devices 2 and the water output by the second water pump device 5, and thus playing a role of temporary storage. The liquid mixer 6 can only receive the hot water output by the electric heating devices 2; or only receive the water output by the second water pump device 5. Furthermore, the liquid mixer 6 also can simultaneously receive the hot water output by the electric heating devices 2 and the water output by the second water pump device 5. The fossil-fuel steam injection boiler 7 heats the water by burning fossil fuels such as fire coal, petroleum, oil, natural gas, biomass, and other carbon-containing fuels, thereby producing the steam. The steam mixer 3 is mainly used for receiving the steam output by the electric heating devices 2 and the steam output by the fossil-fuel steam injection boiler 7, and thus playing a role of temporary storage. The steam mixer 3 can only receive the steam output by the electric heating devices 2; or only receive the steam output by the fossil-fuel steam injection boiler 7. The steam mixer 3 also can simultaneously receive the steam output by the electric heating devices 2 and the steam output by the fossil-fuel steam injection boiler 7. In general, the temperature of the steam in the steam mixer 3 cannot reach the temperature and the pressure of the high-temperature and high-pressure steam required by an oil well, so the steam in the steam mixer 3 needs to be further heated by the super-heater 4 to increase the temperature and the pressure, so that the high-temperature and high-pressure steam that is output by the super-heater 4 can meet the requirement of the oil well.

The low-carbon energy utilization system for steam and power cogeneration of oil field according to the embodiment of the present disclosure has the following advantages. First, the steam is flexibly supplied by adopting the electric heating devices 2. When the power supply satisfied, the electric heating devices 2 can be used for producing the high-temperature and high-pressure steam, and the steam may enter the steam mixer 3. When the power supply is insufficient (e.g., the situations that the power generation of the new energy generation station 8 is insufficient, and the user's demand increases, and the like), the electric heating devices 2 can be used for generating hot water, and the hot water further enters the fossil-fuel steam injection boiler 7 through the liquid mixer 6, and then is heated to be the steam. In this way, power that is generated by low-carbon new energy and cannot be accessed into the oil-field power grid, such as light power and wind power, can be utilized; the power waste can be greatly reduced, and the use of fossil fuels can be reduced maximally. Second, the power generated by new energy and the fossil fuels are used together as an energy source in steam production, and the strong capacity of peak regulation of the fossil-fuel steam injection boiler 7 can make up for the defects that the power of the new energy generation station 8 has high periodicity and large fluctuation. So, the comprehensive energy utilization of the system is achieved, and carbon dioxide emission may be reduced. Third, the characteristic of high thermal inertia of both the steam pipeline and the hot water pipeline is completely utilized. Unstable steam that is generated by the new energy is converted into a stable steam source in thermal recovery of heavy oil through the arrangement of the steam mixer 3 and the liquid mixer 6, and thus the heavy oil production is guaranteed.

In a word, the low-carbon energy utilization system for steam and power cogeneration of oil field according to the embodiment of the present disclosure can solve the problem of discarded power of new energy in the oil field. Further, power that is generated by low-carbon new energy and cannot be accessed into the oil-field power grid, such as light power and wind power, can be used by the electric heating devices 2. Meanwhile, the advantage of flexible peak regulation of the fossil-fuel steam injection boiler 7 is fully exerted, so that the part that is insufficiently injected with the steam is supplemented through the fossil-fuel boiler 7. In this way, the steam injection requirement of the oil field is not only met, but also the use of the fossil fuels can be reduced. On the premise of meeting the requirement of steam injection of the oil field, energy conservation, consumption reduction, and emission reduction are carried out maximally, so as to achieve the steam and power cogeneration.

In embodiments of the present disclosure, the electric heating devices 2 are connected to the first water pump device 1 through a pipeline. The liquid mixer 6 is connected to the second water pump device 5 through a pipeline. The liquid mixer 6 is connected to the electric heating device 2 through a pipeline. The fossil-fuel steam injection boiler 7 is connected to the liquid mixer 6 through a pipeline. The steam mixer 3 is connected to the electric heating device 2 through a pipeline. The steam mixer 3 is connected to the fossil-fuel steam injection boiler 7 through a pipeline. The super-heater 4 is connected to the steam mixer 3 through a pipeline. The super-heater 4 is connected to the oil well through a pipeline. Preferably, the first water pump device 1 and the second water pump device 5 each include a commonly-used pump and a standby pump. When the commonly-used pump breaks down, the standby pump can be started to guarantee normal operation of the low-carbon energy utilization system for steam and power cogeneration of oil field. The pipelines include a commonly-used pipeline and a standby pipeline. When the commonly-used pipeline breaks down, such as leakage, the standby pipeline can be started to guarantee normal operation of the low-carbon energy utilization system for steam and power cogeneration of oil field. A necessary valve and a booster pump are arranged on the pipeline due to the fact that the valve on the pipeline is necessary to control flow-on and flow-off, as well as flow rate. For example, when a certain commonly-used pipeline breaks down, the valve on the commonly-used pipeline that is broken down can be closed in time, and the valve on the standby pipeline is opened. The booster pump is necessary to maintain the pressure balance of the system, thereby avoiding accidents such as suck-back, backflow, and the like.

In one embodiment of the present disclosure, the water that is output by the first water pump device 1 is clear water which does not contain base cations with positive solubility and base cations with negative solubility. Or, this water is softening salt water which does not contain base cations with negative solubility and contains base cations with positive solubility. It should be noted here that the base cations with positive solubility includes, but not limited to, sodium ions, and potassium ions; and the base cations with negative solubility includes, but not limited to, magnesium ions, and calcium ions. Due to the fact that the clear water or soften salt water does not contain magnesium ions, the calcium ions, and the like, during the heating of the electric heating devices 2, it avoids the corrosion and heat transfer deterioration of the heated surface of each electric heating device 2 that are caused by the deposition of the water scale in the electric heating device 2, thereby avoiding the accidents such as pipe explosion and the like.

In one embodiment of the present disclosure, multiple electric heating devices 2 are provided. The multiple electric heating devices 2 are arranged in parallel (as shown in FIG. 1) and/or in series. That is, the number and arrangement modes of the electric heating devices can be arranged according to actual requirements.

In one embodiment of the present disclosure, the electric heating devices 2 are further connected to a blowdown pipe (not shown in FIGURE). In this way, the sewage in the electric heating devices 2 can be discharged at regular intervals.

In one embodiment of the present disclosure, the electric heating devices 2 are high-temperature and high-pressure electric heating boilers. For example, the electric heating boiler is required to reach a high temperature of about 350° C. and a high pressure of 13.5 MPa. Preferably, the electric heating boiler is a resistance boiler or an electrode boiler.

In one embodiment of the present disclosure, the pressure of both the hot water and the steam generated by each electric heating device 2 is higher than operating pressure of the fossil-fuel steam injection boiler 7, thereby guaranteeing that the hot water generated by the electric heating devices 2 flows into the liquid mixer 6 unidirectionally, and guaranteeing that the steam generated by the electric heating devices 2 flows into the steam mixer 3 unidirectionally. In this way, the normal operation of the low-carbon energy utilization system for steam and power cogeneration of oil field can be guaranteed.

In one embodiment of the present disclosure, a steam-liquid separation device is arranged in the steam mixer 3. In this way, when a part of steam in the steam mixer 3 is condensed to liquid, this part of liquid can be collected. Preferably, the steam mixer 3 is a boiler drum, a steam-liquid cyclone separator, or a high-pressure steam header. This is because that the steam-liquid separation device is arranged in the boiler drum, the steam-liquid cyclone separator, or the high-pressure steam header.

In one embodiment of the present disclosure, the fossil-fuel steam injection boiler is a drum boiler, a monotube boiler, a natural circulation boiler, and a forced circulation boiler.

In one embodiment of the present disclosure, the water output by the second water pump device 5 is clear water which does not contain base cations with positive solubility and base cations with negative solubility. Or this water is softening salt water which does not contain base cations with negative solubility and contains base cations with positive solubility. It should be noted here that the base cations with positive solubility include, but not limited to, sodium ions, and potassium ions; and the base cations with negative solubility include, but not limited to, magnesium ions, and calcium ions. In the fossil-fuel steam injection boiler 7, the feed water of the fossil-fuel steam injection boiler 7 is allowed to contain a certain amount of base cations with positive solubility. Due to the fact that the cost for completely removing the base cations with positive solubility is very high, that the water that is output by the second water pump device 5 is allowed to contain the base cations can enable the cost to be reduced.

As shown in FIG. 1, in one embodiment of the present disclosure, the system further includes a transformer station 9 and a power grid 10. The transformer station 9 receives the power from the new energy generation station 8. A first part of the power received by the transformer station 9 is directly supplied to the electric heating devices 2; a second part of the power is transmitted to the power grid 10; and a third part of the power is supplied to users. One part of the power of the power grid 10 is directly used by the electric heating devices 2, and another part of the power of the power grid 10 is supplied to other users. In this way, the power supply of the electric heating devices 2 is more flexible.

In the description of the specification, a description referring to "one embodiment," "certain embodiments," "an illustrative embodiment," "an example," "a specific example," or "certain examples," or the like, means that a particular feature, structure, material, or characteristic described in connection with the embodiment or example is included in at least one embodiment or example of the present disclosure. In the present description, illustrative expressions of the above terms do not necessarily refer to the same embodiment or example. Moreover, the particular features, structures, materials, or characteristics described may be combined in any suitable manner in any one or more embodiments or examples.

Although the embodiments of the present disclosure have been shown and described, it should be understood by those of ordinary skill in the art that changes, modifications, replacements, and variations can be made in these embodiments without departing from principles and purposes of the present disclosure.

What is claimed is:

1. A low-carbon energy utilization system for steam and power cogeneration of an oil field, wherein the low-carbon energy utilization system comprises:
    a first water pump device;
    a second water pump device;
    electric heating devices connected to the first water pump device, each of the electric heating devices is used for receiving and heating first water output by the first water pump device, and outputting the first water after being heated and first steam;
    a liquid mixer connected to the second water pump device and the electric heating devices, wherein second water that is output by the second water pump device and the first water after being heated, which is output by each of the electric heating devices, are entered into the liquid mixer; and the second water and the first water after being heated are output by the liquid mixer;
    a fossil-fuel steam injection boiler connected to the liquid mixer, the fossil-fuel steam injection boiler is used for receiving the second water and the first water after being heated, which are output by the liquid mixer; and the fossil-fuel steam injection boiler is further used for generating and outputting second steam;
    a steam mixer connected to the electric heating devices and the fossil-fuel steam injection boiler, wherein the first steam that is output by each of the electric heating devices and the second steam that is output by the fossil-fuel steam injection boiler are both entered into the steam mixer and are output by the steam mixer;
    a super-heater connected to the steam mixer, the super-heater is used for receiving third steam output by the steam mixer, the super-heater is used for heating the third steam to be required high-temperature and high-pressure steam, and conveying the required high-temperature and high-pressure steam to an oil well;
    a new energy generation station, the new energy generation station is used for supplying power to the electric heating devices; and
    wherein a steam-liquid separation device is arranged in the steam mixer.

2. The low-carbon energy utilization system for steam and power cogeneration of oil field according to claim 1, wherein the electric heating devices are connected to the first water pump device through a first pipeline, the liquid mixer is connected to the second water pump device through a second pipeline, the liquid mixer is connected to the electric heating devices through a third pipeline, the fossil-fuel steam injection boiler is connected to the liquid mixer through a fourth pipeline, the steam mixer is connected to the electric heating devices through a fifth pipeline, the steam mixer is connected to the fossil-fuel steam injection boiler through a sixth pipeline, the super-heater is connected to the steam mixer through a seventh pipeline, and the super heater is connected to the oil well through an eighth pipeline.

3. The low-carbon energy utilization system for steam and power cogeneration of oil field according to claim 1, wherein the first water output by the first water pump device is clear water which does not contain base cations with positive solubility and base cations with negative solubility; or the first water is softening salt water which does not contain the base cations with negative solubility and contains the base cations with positive solubility.

4. The low-carbon energy utilization system for steam and power cogeneration of oil field according to claim 1, wherein the electric heating devices are arranged in parallel.

5. The low-carbon energy utilization system for steam and power cogeneration of oil field according to claim 1, wherein the electric heating devices are connected to a blowdown pipe.

6. The low-carbon energy utilization system for steam and power cogeneration of oil field according to claim 1, wherein the electric heating devices are high-temperature and high-pressure electric heating boilers.

7. The low-carbon energy utilization system for steam and power cogeneration of oil field according to claim 1, wherein the pressure of both the first water after being heated and the first steam generated by each of the electric heating devices is higher than operating pressure of the fossil-fuel steam injection boiler, so as to enable the first water after being heated, which is generated by each of the electric heating devices, to unidirectionally flow into the liquid mixer, and to enable the first steam generated by the each of electric heating devices to unidirectionally flow into the steam mixer.

8. The low-carbon energy utilization system for steam and power cogeneration of oil field according to claim 1, wherein the second water output by the second water pump device is clear water which does not contain base cations with positive solubility and base cations with negative solubility; or the second water is softening salt water which does not contain the base cations with negative solubility and contains the base cations with positive solubility.

9. The low-carbon energy utilization system for steam and power cogeneration of oil field according to claim 1, wherein the low-carbon energy utilization system further comprises a transformer station and a power grid, wherein the transformer station receives the power from the new energy generation station; a first part of the power received by the transformer station is directly supplied to the electric heating devices; a second part of the power is transmitted to the power grid; and a third part of the power is supplied to users; and one part of the second part of the power that is transmitted to the power grid is directly used by the electric heating devices, and another part of the second part of the power is supplied to other users.

* * * * *